(12) United States Patent
Fernandez

(10) Patent No.: US 7,014,103 B2
(45) Date of Patent: Mar. 21, 2006

(54) DIFFERENTIAL RADIO FREQUENCY IDENTIFICATION READER

(75) Inventor: Alberto J. Fernandez, Miami, FL (US)

(73) Assignee: XTec, Incorporated, Miami, FL (US)

( * ) Notice: Subject to any disclaimer, the term of this patent is extended or adjusted under 35 U.S.C. 154(b) by 0 days.

(21) Appl. No.: 10/867,372

(22) Filed: Jun. 14, 2004

(65) Prior Publication Data

US 2005/0017073 A1    Jan. 27, 2005

Related U.S. Application Data

(60) Provisional application No. 60/478,669, filed on Jun. 13, 2003.

(51) Int. Cl.
*G06F 17/00*       (2006.01)

(52) U.S. Cl. ................ 235/375; 235/385; 235/439; 340/572.1

(58) Field of Classification Search ........... 340/825.36, 340/7.37, 572.1, 571.2, 5.1, 5.2, 5.66, 5.61, 340/7.97, 5.92, 316–317, 10.1–10.6, 572.4, 340/10.41, 5.64, 572.7; 235/382, 451, 472.02, 235/487, 375; 343/895
See application file for complete search history.

(56) References Cited

U.S. PATENT DOCUMENTS

| | | | | |
|---|---|---|---|---|
| 3,670,303 | A * | 6/1972 | Dame | 714/819 |
| 4,031,513 | A * | 6/1977 | Simciak | 340/870.03 |
| 5,029,183 | A * | 7/1991 | Tymes | 375/141 |
| 5,656,336 | A * | 8/1997 | Kamen et al. | 427/511 |
| 5,907,242 | A * | 5/1999 | Gard | 324/326 |
| 5,923,300 | A * | 7/1999 | Mejia | 343/788 |
| 5,995,019 | A * | 11/1999 | Chieu et al. | 340/10.32 |
| 6,078,251 | A * | 6/2000 | Landt et al. | 340/10.41 |
| 6,229,443 | B1 | 5/2001 | Roesner | |
| 6,236,315 | B1 * | 5/2001 | Helms et al. | 340/572.7 |
| 6,265,976 | B1 * | 7/2001 | Roesner | 340/572.4 |
| 6,535,175 | B1 * | 3/2003 | Brady et al. | 343/795 |
| 6,636,728 | B1 * | 10/2003 | Avenel | 455/277.1 |
| 6,686,830 | B1 * | 2/2004 | Schirtzer | 340/10.2 |
| 2003/0042316 | A1 * | 3/2003 | Teraura | 235/487 |
| 2003/0064739 | A1 * | 4/2003 | Lindskog et al. | 455/504 |
| 2003/0191767 | A1 * | 10/2003 | Kabala | 707/100 |
| 2004/0036595 | A1 * | 2/2004 | Kenny et al. | 340/505 |
| 2004/0113790 | A1 * | 6/2004 | Hamel et al. | 340/572.1 |
| 2004/0150387 | A1 * | 8/2004 | Lyon et al. | 324/127 |
| 2004/0166903 | A1 * | 8/2004 | Nakanishi | 455/562.1 |
| 2004/0178886 | A1 * | 9/2004 | Watanabe et al. | 340/10.1 |
| 2004/0195944 | A1 * | 10/2004 | Sugihara | 312/283 |
| 2004/0201457 | A1 * | 10/2004 | O'Toole et al. | 340/10.33 |
| 2004/0233043 | A1 * | 11/2004 | Yazawa et al. | 340/10.3 |
| 2004/0253939 | A1 * | 12/2004 | Castaneda et al. | 455/341 |
| 2005/0024187 | A1 * | 2/2005 | Kranz et al. | 340/10.33 |
| 2005/0024825 | A1 * | 2/2005 | Smith et al. | 361/687 |
| 2005/0026596 | A1 * | 2/2005 | Markovitz | 455/411 |
| 2005/0043006 | A1 * | 2/2005 | Bhatti et al. | 455/333 |

* cited by examiner

*Primary Examiner*—Karl D. Frech
*Assistant Examiner*—Daniel Walsh
(74) *Attorney, Agent, or Firm*—Priest & Goldstein, PLLC

(57) ABSTRACT

Systems and techniques for reading a radio frequency identification transponder are described. A transmit coil produces a transmit field to power and interrogate the transponder. A reference coil and a receive coil furnish inputs to a differential amplifier, balanced so that the differential amplifier produces a predetermined signal. The receive coil senses changes produced by the transponder, while the reference coil is relatively isolated from such changes. The differential amplifier produces an amplified signal based on the difference between the inputs from the receive coil and the reference coil, so that the signal produced by the differential amplifier is based on the field effect changes produced by the transponder.

7 Claims, 3 Drawing Sheets

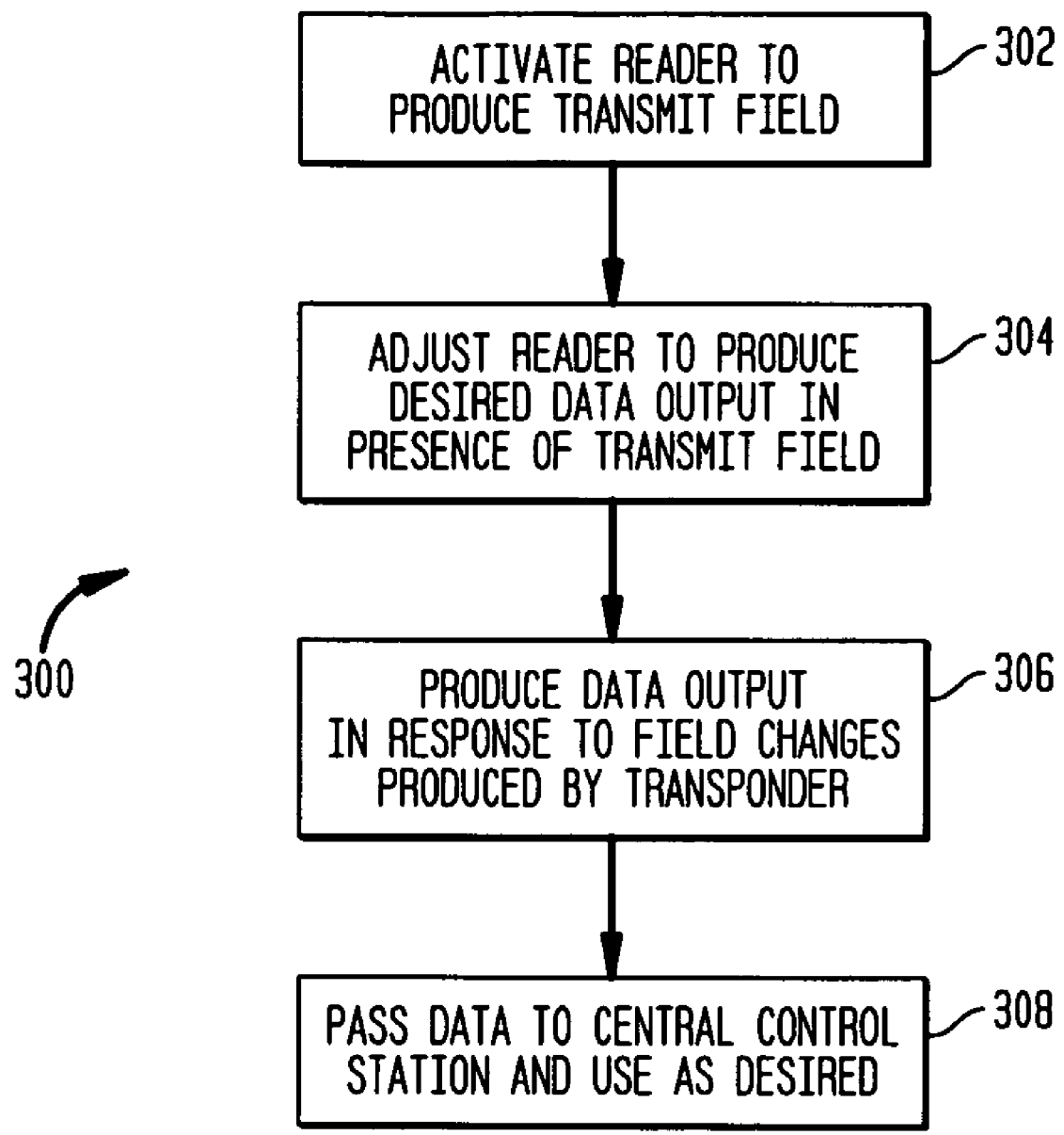

DIFFERENTIAL RADIO FREQUENCY IDENTIFICATION READER

RELATED APPLICATIONS

The present invention claims the benefit of U.S. Provisional Application Ser. No. 60/478,669 entitled "Differential Radio Frequency Identification Reader" and filed Jun. 13, 2003, which is incorporated by reference herein in its entirety.

FIELD OF THE INVENTION

The present invention relates generally to improvements in radio frequency sensing and measurement techniques. More particularly, the invention relates to advantageous techniques for radio frequency identification systems.

BACKGROUND OF THE INVENTION

Radio frequency identification (RFID) systems are used in a wide variety of applications, and provide convenient mechanisms for the tracking, identification, and authentication of persons or objects. An RFID system typically includes one or more readers deployed at selected locations in an installation. Readers are typically deployed where it is desired to control or to receive information about objects or persons bearing or associated with RFID tags. For example, readers may be deployed so as to cover entrances and exits, inventory control points, transaction terminals, and the like. Each reader is capable of receiving information from RFID tags, with each tag typically being associated with an object or person. A tag may be affixed to or embedded in an object with which it is associated, or be part of a badge, card, or token given to a person. Signals conveyed between the tag and the reader allow the reader to sense information on the tag. This information may include, for example, authentication or identification information, or may include instructions, such as a sequence of processes or operations to be conducted upon an object bearing the tag.

Each tag may include stored information that is communicated wirelessly to the reader. Tags typically carry information in onboard memory such as ROM, and the amount of information may range from a single bit to kilobits or even more. Single bit tags typically serve as surveillance devices, such as theft prevention tags. Information amounting to a few bits or tens of bits may serve as an identifier, such as may be found in a badge or smart card, while information amounting to kilobits may comprise a portable data file that can be used for identification, communication, or control. The reader may, for example, extract information from a tag and use it for identification, or may store it or convey it to a responsible party. Alternatively, a data file may include a set of instructions that may initiate or control processes or actions without recourse to, or in coordination with, information stored elsewhere.

A tag typically includes a wireless communication device, for example a transmitter or transponder, that is capable of wirelessly communicating stored information to the reader. The tag may communicate the information independently or in response to a signal, such as an interrogation signal, received from the reader. Both active and passive tags are known in the art. An active tag has an onboard power source, while a passive tag may operate without an internal power source, deriving its operating power from a field generated by the reader. Passive tags are much lighter and less expensive than active tags and may offer a virtually unlimited operational lifetime. However, passive tags typically have shorter read ranges than active tags and require a higher powered reader. Passive tags are also constrained in their capacity to store data and their ability to perform well in electromagnetically noisy environments.

Sensitivity and orientation performance may also be constrained by limitations on available power. Despite these limitations, passive transponders offer significant advantages because they have an almost indefinite lifetime and are generally less expensive than active transponders or transmitters.

A passive tag typically includes memory, which may be read only memory (ROM), nonvolatile programmable memory such as electrically erasable programmable read only memory (EEPROM), or random access memory (RAM), depending on the applications to which the tag is to be put. Programmable memory used by a passive tag should be nonvolatile, so that data is not lost when the tag is in a powered down state. When the tag is not actively communicating with the reader, the tag is in a powered down state.

One commonly used implementation of a passive RFID tag includes analog or digital circuitry for processing signals received from and sent to the reader, as well as a coil for communicating with a compatible reader, for example by inductive coupling. The coil is also often referred to as an antenna. Communication through inductive coupling typically involves superimposing the data upon a rhythmically varying field or carrier wave, that is, using the data to modulate the carrier wave. The carrier wave may suitably be a sinusoidal wave.

In order to receive data from a passive tag or transponder that communicates through inductive coupling, the reader generates a magnetic field, typically using a reader coil that inductively couples to the transponder coil. The magnetic field induces a voltage in the transponder coil, thereby supplying power to the transponder. Data may suitably be transmitted to the reader by changing one parameter of the transmitting field. This parameter may be amplitude, frequency or phase.

The passive tag communicates with the reader by changing the load on the transmitting field. Load changes may suitably affect either the amplitude or phase of the field. These changes to the field are sensed by the reader coil, which produces a modulated current in response to the field. This current is analyzed, for example, demodulated, to extract the data, which is then used in ways called for by the design of the particular RFID system.

Typical prior art readers may employ a single coil to generate the power RF field, transmit data, and receive data from the RFID transponder. If a single coil is used, it must be relatively precisely tuned. Typically, the coil used is a resonant inductor. The use of a very precisely tuned resonant inductor is relatively expensive. In addition, the operating range of typical prior art readers typically depends on the diameter of the reader coil, leading to a relatively short operating range.

There exists, therefore, a need for systems and techniques that will allow for a reader having a lower cost sensing circuit and a greater operating range.

SUMMARY OF THE INVENTION

In order to overcome limitations such as those noted above, an RFID reader according to an aspect of the present invention employs separate transmit and receive coils, and also employs a differential amplifier connected to the receive coil and to a reference coil. The reference coil and the receive coil are preferably selected and arranged so that the differential amplifier produces a desired output level, such as zero. The reference coil is located so that it is effectively isolated from field effects produced by the tag or transponder communicating with the reader, while the transmit coil is located and designed so that it is exposed to and responds to these effects.

Additionally, the present invention addresses a method in which the RF field is generated by a power transmitter coil which does not have such stringent requirements for tuning, and the use of dual receive coils, allows for much greater range, better signal reception performance and lower cost as addressed further below.

A more complete understanding of the present invention, as well as further features and advantages of the invention, will be apparent from the following Detailed Description and the accompanying drawings.

BRIEF DESCRIPTION OF THE DRAWINGS

FIG. 3 illustrates a process of RFID data communication according to an aspect of the present invention.

DETAILED DESCRIPTION

Figure 1:
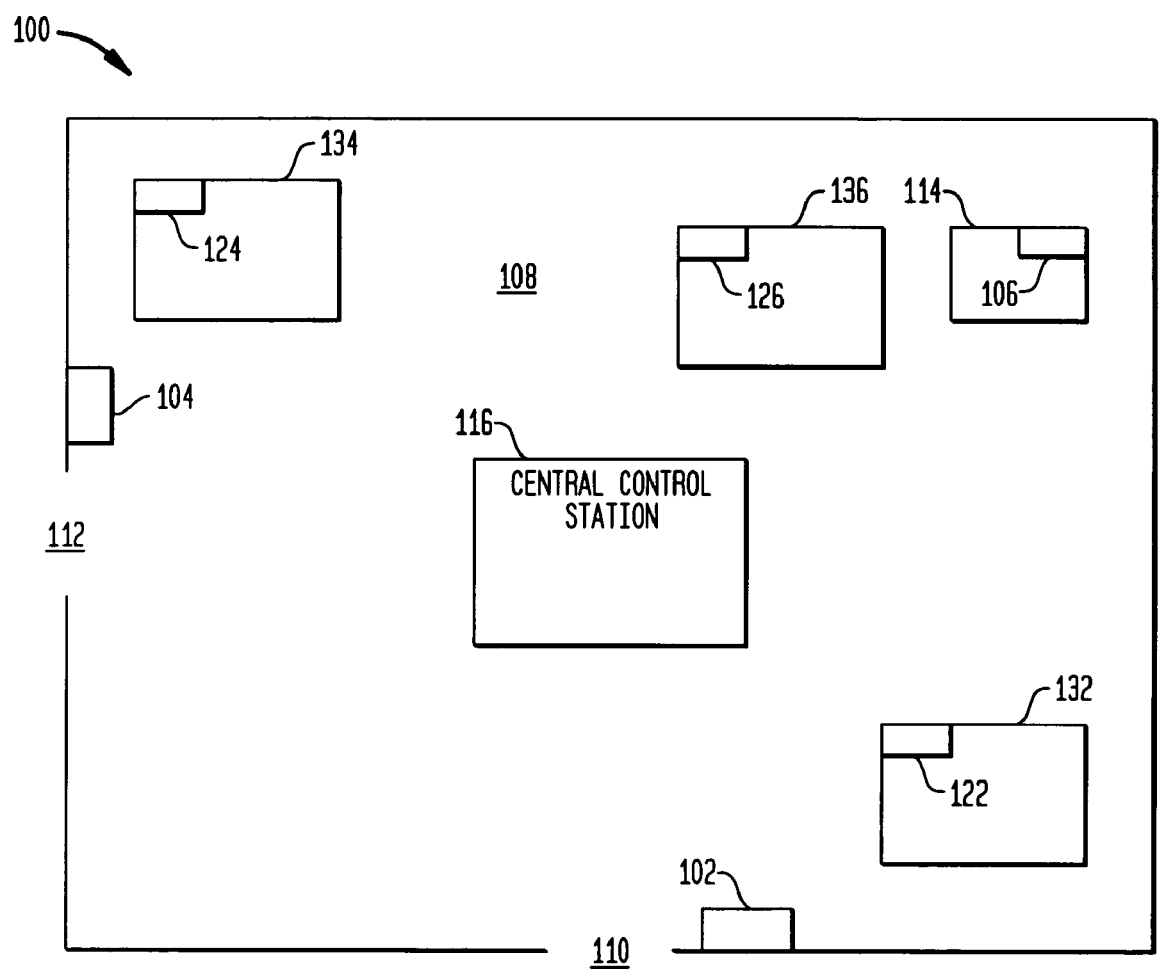
FIG. 1 illustrates an RFID system according to an aspect of the present invention.

FIG. 1 shows an RFID system 100 according to an aspect of the present invention. System 100 includes a plurality of RFID readers 102, 104 and 106 built in accordance with the teachings of the present invention as discussed further below. The readers 104 and 106 are each deployed at an appropriate location in an installation zone 108, such as a retail store, an inventory warehouse, a building for which security is to be provided, or the like. The reader 102 is deployed at an entrance 110, such as a door through which people pass to enter or exit the premises, and the reader 104 is deployed at a delivery receiving station 112, such as a loading dock for receiving deliveries. The reader 106 is preferably implemented in a portable inventory control device 114. Each of the readers 102, 104 and 106 communicates with a central control station 116.

Each of the readers 102, 104 and 106 also communicates with any compatible RFID tags that are brought within its range. In FIG. 1, tags 122, 124 and 126 are shown as within range of the readers 102, 104 and 106, respectively. The tags 122, 124 and 126 are attached to objects or people 132, 134 and 136, respectively, and each tag is programmed with information relating to the object or person to which it is attached. The information may take a wide variety of forms and may be more or less detailed depending on the needs to be served by the information. For example, the information may include merchandise identification information, such as a universal product code. A tag may include identifying information and security clearance information for an authorized person to whom the tag has been issued. A tag may also have a unique serial number, in order to uniquely identify an associated object or person. Alternatively, a tag may include more detailed information relating to an object or person, such as a complete description of the object or person. As a further exemplary alternative, a tag may store a single bit, in order to provide for theft control or simple tracking of entry and departure through the detection of an object or person at a particular reader, without necessarily specifically identifying the object or person.

Figure 2:
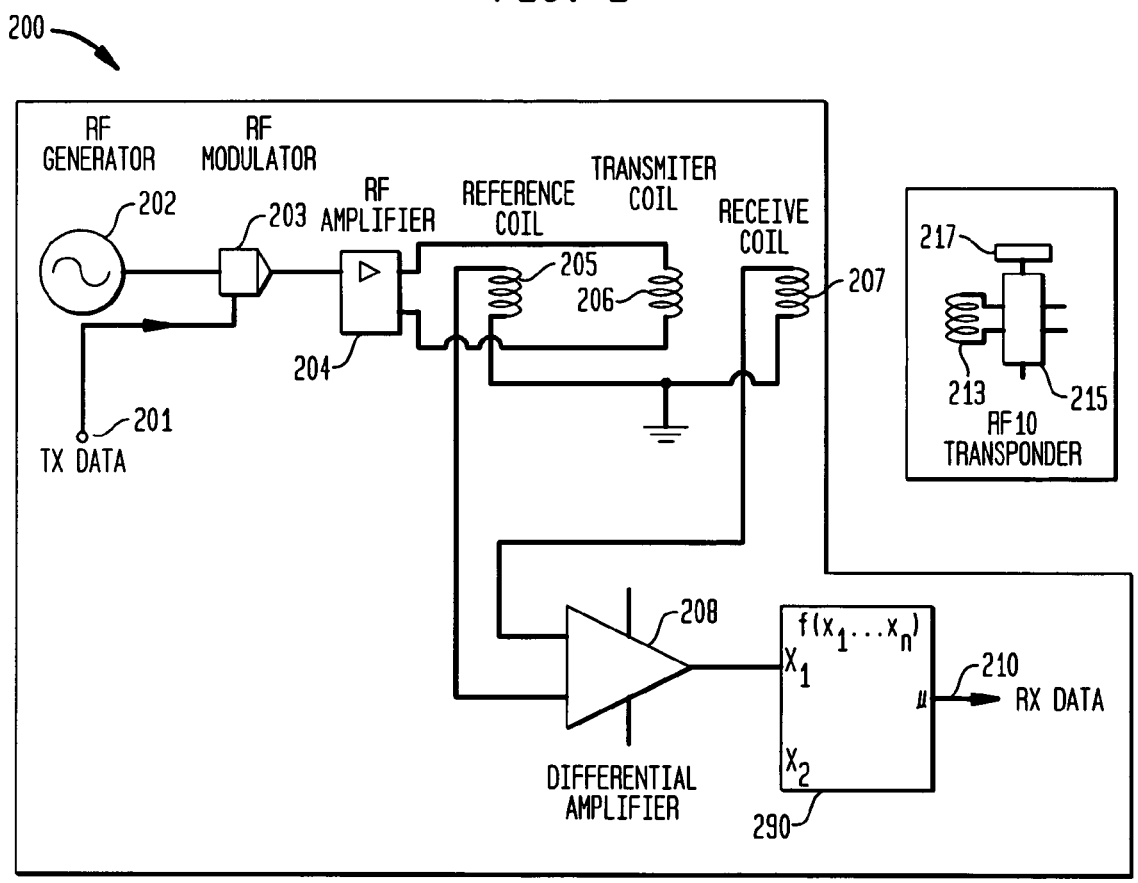
FIG. 2 illustrates various aspects of an RFID reader according to one embodiment of the present invention.

Each of the tags 122, 124 and 126 preferably employs a passive transponder that communicates by modulating a field emitted by the reader. As illustrated in FIG. 2 and described in greater detail below, a reader, such as reader 200 of FIG. 2, transmits a radio frequency (RF) signal to create an RF field. The reader includes a receive coil that detects the field. Changes in the field caused by a tag induce current changes in the receive coil. The reader also includes a reference coil that is effectively isolated from changes in the RF field caused by the tag. The reference coil and the receive coil supply inputs to a differential amplifier, which is suitably adjusted so that its output is zero in the absence of any disruption to the RF field caused by a tag, and detected by the receive coil. A tag's disruption of the RF field sensed by the received coil therefore changes an input to the differential amplifier, causing the differential amplifier to have a nonzero output that can be amplified as desired. The readers 102, 104 and 106 are therefore able to detect relatively small disruptions to the fields they emit, allowing them to detect passive RFID devices at relatively long ranges. Amplification of the difference signal allows detection of even small disruptions.

FIG. 2 illustrates details of reader 200, which may suitably be employed as the readers 102, 104 and 106 of FIG. 1. The reader 200 includes a radio frequency (RF) generator 202 which provides an RF signal at its output. This RF signal is in turn connected as one input of an RF modulator 203. The RF signal may preferably be a 13.56 MHz signal, which is suitable for use with transponders operating under the ISO 14443 A/B or ISO 15693 standards. It will be recognized, however, that other frequencies may be supported as desired. The RF modulator 203 modulates an input signal comprising transmission data (Tx Data) 201 onto the RF signal from generator 202 to produce an amplitude modulated RF signal at its output. This amplitude modulated signal is then amplified by an RF amplifier 204 and drives a transmit coil 206. The transmit coil 206 transmits a transmit signal. When an RFID transponder 211, such as those found in tags 122, 124 and 126, for example, is brought within the reading range of the reader 200, the transmit signal induces a current within a coil 213 of the RFID transponder 211 and thereby provides power to the RFID transponder 211. In addition, the transmit coil 206 may also serve as a data transmitter for transmitting data from the reader 200 to the transponder 211. Changes to the field produced by the transmit coil 206 caused by the modulation of the transmit data 201 onto the RF signal induce corresponding changes in current flowing through the coil 213 of the transponder 211. The signal, or current flow, can be analyzed by the transponder 211 in order to extract the data represented by the changes in the signal or current flow. This data may then be processed by circuitry, such as an ASIC, or a processor 215 within the transponder 211. Data within a memory 217 of the transponder 211 is extracted and processed to produce a modulated signal that is applied to the coil 213 of the transponder 211. The field generated by the coil of the transponder 211 produces changes in the load on the transmit field generated by the transmit coil 206.

A reference coil 205 and a receive coil 207 are effectively inductively coupled to the transmit coil 206 and the internal coil 213 of the transponder 211, respectively. The receive coil 207 therefore experiences and is affected by the magnetic field produced by the transmit coil 206, as well as changes in that field. By contrast, reference coil 205 is arranged so that it is effectively isolated from changes brought about by the internal coil 213 of transponder 211.

Both the reference coil 205 and the receive coil 207 are connected to a differential amplifier 208. Proper adjustments allow balancing of the inputs to the differential amplifier 208, that is, the outputs of the reference coil 205 and the receive coil 207, so that the differential amplifier 208 produces a predetermined signal. In the present exemplary embodiment, the inputs to the differential amplifier 208 may suitably be balanced so that the differential amplifier 208 produces no significant signal when the reader 200 is not within range of any tags or transponders, such as transponder 211.

The RFID transponder 211 transmits data by applying a load to its internal coil which causes a "dampening" of the RF field sensed by the receive coil 207. As discussed above, the reference coil 205 is placed so that it is minimally affected by the effect of the transponder's dampening of the RF field.

Thus, the output of the differential amplifier 208 is substantially affected only by conditions sensed by the receive coil 207. The output of the differential amplifier depends on the differences between its inputs, but because of the placement or shielding of the reference coil 205, the output essentially depends on changes sensed by the receive coil 207. However, because the reference coil 205 and the receive coil 207 are balanced through adjustments, it is not necessary for either coil to be precisely selected and tuned. Instead, any coils may be selected that have the desired general characteristics and that can be properly adjusted to achieve the desired balancing.

Changes in the field sensed by the receive coil 207 cause a difference between the output of the receive coil 207 and that of the reference coil 205. These differences cause an amplified signal at the output of the differential amplifier 208. This strong signal is then fed to a decoder 209, which converts it into a digital data stream which is output at a receiver (RX) data output 210.

The differential signal resulting from subtracting the steady state condition sensed by the reference coil 205 from the changed conditions sensed by the receive coil 207 and indicative of the data transmitted by transponder 211 is amplified by the differential amplifier 208. Therefore, the reader 200 can effectively sense fainter effects than could be sensed using the receive coil 207 alone. Thus, the RFID reader 200 described here can have an effective range substantially greater than prior art readers that depend on a signal produced by effects experienced by a single coil.

It will be recognized that the techniques of the present invention may be adapted for use with an amplitude modulation (AM) or frequency modulation (FM) signal, and may be employed with any number of presently existing RFID tags.

FIG. 3 illustrates the steps of a process 300 of RFID identification according to an aspect of the present invention. At step 302, an RFID reader is activated to produce a transmit field. The reader may suitably be similar to the readers 102, 104 and 106 of FIG. 1 and the reader 200 of FIG. 2. At step 304, the reader is controlled so that its transmit field produces a desired data output.

At step 306, upon introduction of a compatible transponder within range of the transmit field produced by the reader, changes to the transmit field induced by the transponder are sensed and produce a data output at the reader. The data output is suitably generated by decoding of a differential amplifier input produced by the changes to the transmit field. The changes to the transmit field are produced in accordance with data stored in the transponder, and produce changes in the transmit field by varying the load that the transponder imposes on the transmit field. The load variations are typically produced according to data stored in the transponder and to be communicated to the reader.

The changes to the transmit field are sensed to produce a receive signal which is supplied to the differential amplifier, and the signal produced by the difference between the receive signal and the reference signal is amplified to produce a differential amplifier output. The differential amplifier output is decoded to produce the reader data output representing the data stored in the transponder.

At step 308, the reader data output is passed to a central control station and used as desired. By way of example, the data output may be suitably employed to identify an object or person associated with the transponder data and to take appropriate steps in response to the presence of the object or person in the vicinity of the reader, such as logging the object in inventory, entering the object in a transaction record, noting the time of entry of a person or access to a secure zone, or the like.

While the present invention is disclosed in the context of a presently preferred embodiment, it will be recognized that a wide variety of implementations may be employed by those of ordinary skill in the art consistent with the above discussion and the claims which follow below.

I claim:

1. A differential radio frequency identification reader for producing a signal resulting from effects caused by a radio frequency identification (RFID) tag to be read, comprising:
    a transmit coil for emitting a transmit field to power and interrogate a transponder;
    a receive coil for sensing changes in the transmit field resulting from effects caused by the RFID tag;
    a reference coil effectively isolated from the RFID tag and operating to sense the transmit field unaffected by the RFID tag; and
    a differential amplifier for receiving inputs from the receive coil and the reference coil, the differential amplifier being operative to amplify a difference of said inputs thereby producing an amplified output signal reflecting the changes in the transmit field caused by the RFID tag.

2. The reader of claim 1 wherein the RFID tag is a passive tag which communicates by changing a load on the transmit field.

3. The reader of claim 1 wherein the RFID tag is associated with an object or person whose location is to sensed.

4. The reader of claim 1 wherein said reader is integrated in a portable inventory control device having an extended effective read range.

5. The reader of claim 1 further comprising means for communicating with a central control station.

6. The reader of claim 1 further comprising means for adjusting the output of the differential amplifier to substantially zero in the absence of changes in the transmit field caused by the RFID tag.

7. The reader of claim 1 further comprising:
    a radio frequency (RF) generator for producing an RF output signal; and
    a radio frequency modulator for receiving the RF output signal and for modulating a transmission data signal onto the RF output signal.

* * * * *